United States Patent
Guttenberger et al.

(10) Patent No.: US 8,198,780 B2
(45) Date of Patent: Jun. 12, 2012

(54) STATOR FOR AN ELECTRONICALLY COMMUTATED DC MOTOR

(75) Inventors: Richard Guttenberger, Greding (DE); Armin Suttner-Reimann, Schwabach (DE)

(73) Assignee: Bühler Motor GmbH, Nürnberg (DE)

( * ) Notice: Subject to any disclaimer, the term of this patent is extended or adjusted under 35 U.S.C. 154(b) by 183 days.

(21) Appl. No.: 12/700,237

(22) Filed: Feb. 4, 2010

(65) Prior Publication Data

US 2010/0213788 A1 Aug. 26, 2010

(30) Foreign Application Priority Data

Feb. 26, 2009 (DE) .......................... 10 2009 010 782

(51) Int. Cl.
*H02K 1/06* (2006.01)
(52) U.S. Cl. ................................. 310/216.135
(58) Field of Classification Search ........... 310/216.061, 310/216.135, 216.051, 216.058, 216.086, 310/216.088, 216.009
See application file for complete search history.

(56) References Cited

U.S. PATENT DOCUMENTS

| | | | |
|---|---|---|---|
| 4,425,523 A | 1/1984 | Detinko et al. | |
| 6,472,780 B2 * | 10/2002 | Kikuchi et al. | 310/52 |
| 6,888,284 B2 | 5/2005 | Eggers et al. | |
| 7,498,709 B2 * | 3/2009 | Shteynberg et al. | 310/184 |
| 7,732,969 B2 * | 6/2010 | Ishizeki et al. | 310/194 |
| 2009/0134742 A1 | 5/2009 | Rhode | |
| 2010/0007236 A1 * | 1/2010 | Sano et al. | 310/216.135 |

FOREIGN PATENT DOCUMENTS

DE 102005051506 A1 5/2007
JP 2008-104325 * 5/2008

* cited by examiner

*Primary Examiner* — Nguyen N Hanh
(74) *Attorney, Agent, or Firm* — Jacobson Holman PLLC (57) ABSTRACT

A stator (10) for an electronically commutated DC motor with a number of stator poles (1) formed as individual parts, consisting of a pole core (25), pole shoes (26) and return sections (27), in which the return sections (27) of the stator poles (1) have intermeshing profiles, on which they lie against each other, so that the return sections form a hollow cylindrical return (35) with each other, in which the pole cores (25) connect to the return sections (27) directed radially inward. The individual stator poles are each provided with an insulation and a winding, and the wound stator poles (1) are held together by a retaining part that does not serve as motor housing. The task of the present invention is to provide a stator for an electrically commutated DC motor, which can be mounted simply and reliably, and which facilitates assembly of the stator in the motor housing. This task is achieved by providing that the retaining part is a metallic clamping ring (4), which is positioned under bias around the entire periphery of the hollow cylindrical return (35) and tightens the stator poles (1) to each other.

13 Claims, 7 Drawing Sheets

Fig. 18

STATOR FOR AN ELECTRONICALLY COMMUTATED DC MOTOR

BACKGROUND OF THE INVENTION (1) Field of the Invention

The invention concerns a stator for an electronically commutated DC motor with a number of stator poles formed as individual parts, in general, and to a stator retaining system that does not form part of a motor housing, in particular.

(2) Description of Related Art including Information Disclosed under 37 CFR 1.97 and 1.98

A generic stator is known from DE 10 2005 051 506 A1, in which two retaining parts, consisting of plastic, are provided with axially protruding pins, which engage in holes of the return sections of the stator poles and connect them to each other. These plastic retaining parts can serve merely as adjustment devices for the stator poles, but cannot clamp them sufficiently to each other. For clamping of the poles, they must be pressed in known fashion in the motor housing. For example, it is known to mount the motor housing by shrinking on the stator poles or to provide the stator poles with flexible protrusions, in order to permit pressing into the motor housing. All these known methods, however, are very expensive to carry out.

An object of the present invention is to present a stator for an electronically commutated DC motor that can be simply and reliably installed and facilitates assembly of the stator in the motor housing.

BRIEF SUMMARY OF THE INVENTION

This object is solved according to the invention, which provides a stator for an electronically commutated DC motor. The stator consists of a plurality of individual stator poles, each of the stator poles including a pole core, pole shoes and return sections, each of the return sections of the stator poles having first and second intermeshing profiles, on which the first and second profiles intermesh with each other, so that they together form a hollow cylindrical return with a periphery, in which the pole cores connect to the return sections directed radially inward. An insulation and a winding are provided on each of the individual stator poles. A retaining part that does not serve as part of a motor housing is a metal clamping ring, which is positioned so that it is under bias around the entire periphery of the hollow cylindrical return and tightens the stator poles relative to each other.

Since the retaining part is a metallic clamping ring, which is positioned under bias around the entire periphery of the hollow cylindrical return, the stator poles can be simply tightened to each other, in which case the clamping ring is not required either as a return or motor housing element and can therefore be laid out and optimized for its primary task. Since the stator need no longer necessarily be tightened to the motor housing and the motor housing also need not serve as a return element, greater freedom for configuration exists with respect to housing tightness and weight.

There are many modifications and advantages forming part of the invention. In one embodiment, the clamping ring has a plurality of perforations spaced about the hollow cylinder defining spaced bridges and connectors, which connect two ring areas on the entire periphery to each other. The ring areas are deformed radially inward at several locations, so that they form axial securing devices. Also, the bridges are biased inward on the hollow cylindrical return.

It is also contemplated that the retaining part includes at least one electrical connection to produce interconnection of the windings. The clamping ring is in one piece with screw eyes, which connect to the ring area and are bent at a right angle. The stator is screwed, caulked, riveted or ultrasonically welded to a motor housing via the clamping ring. The clamping ring comprises a flat sheet-metal strip, whose ends are connected to each other according to a bending process and form a connection site.

The clamping ring is connected to an insulation ring, which has slits to accommodate winding ends and receptacles for insulation displacement contacts. The insulation ring is provided with snap tabs that are locked on one edge of a ring area of clamping ring. Finally, the insulation ring is mechanically connected to a circuit board, which connects the winding ends to the neutral point connection and plug pins.

BRIEF DESCRIPTION OF THE SEVERAL VIEWS OF THE DRAWINGS

A practical example of the invention is further explained below with reference to the drawing. In the drawing.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figures 1, 2:
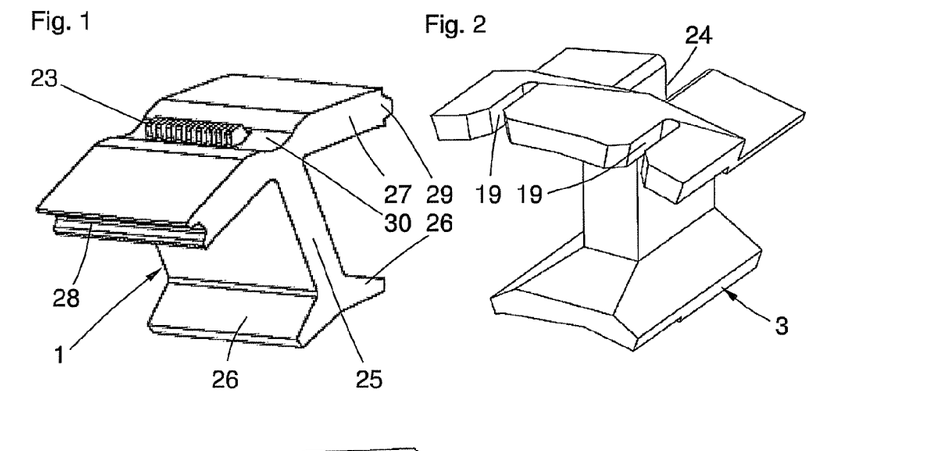
FIG. 1 shows a stator pole.
FIG. 2 shows a first end cap with slit.

FIG. 1 shows a stator pole 1, consisting of a pole core 25, pole shoes 26, return sections 27, which have profiles that match each other in the form of a concave profile 28 and a convex profile 29, and a pit-like recess 30, from which a protrusion 23 emerges. The protrusion 23 does not enclose the entire length of the stator pole 1, but is arranged in the center and leaves a receptacle space on both ends. The stator poles can be designed both as punch-stacked parts and as powder-pressed parts.

FIG. 2 shows an end cap 3 with a receptacle space 24 for one-sided mounting of the stator pole, and the end cap 3 additionally includes receiving areas for a winding head of a stator winding and slits 19 for fastening of the winding ends of the stator winding.

Figure 3:
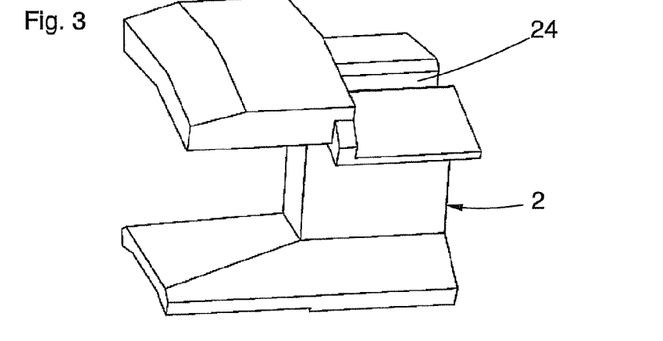
FIG. 3 shows a second end cap without slit.
Figure 4:
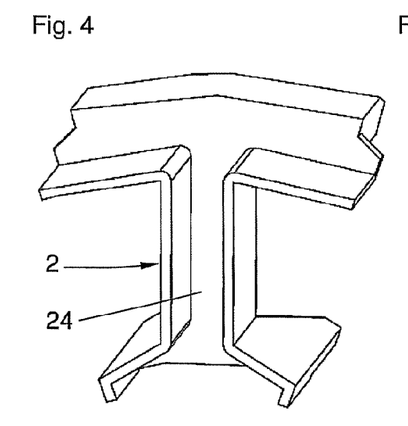
FIG. 4 shows the second end cap from another perspective.
Figure 5:
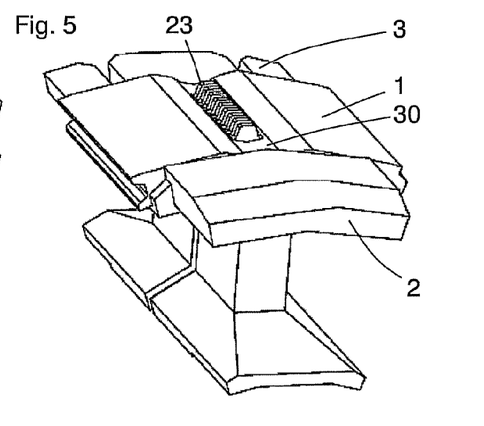
FIG. 5 shows a stator pole with the mounted end caps.

FIG. 3 shows another end cap 2 designed without slit, but otherwise formed like end cap 3. FIG. 4 shows the end cap 2 from another perspective. FIG. 5 shows a stator pole 1 with end caps 2, 3 mounted on its opposite faces. End caps of this type are known and used in a variety of embodiments.

Figure 6:
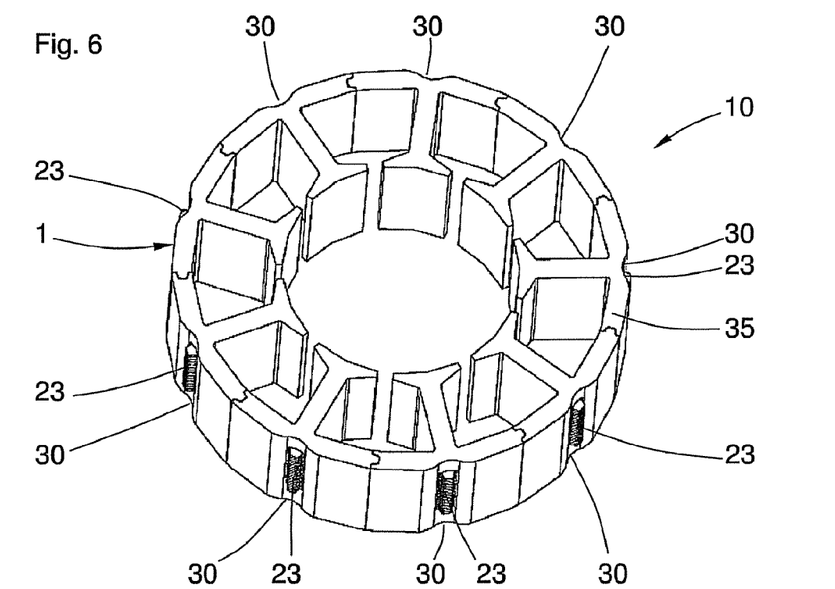
FIG. 6 shows stator poles assembled to a stator.
Figure 7:
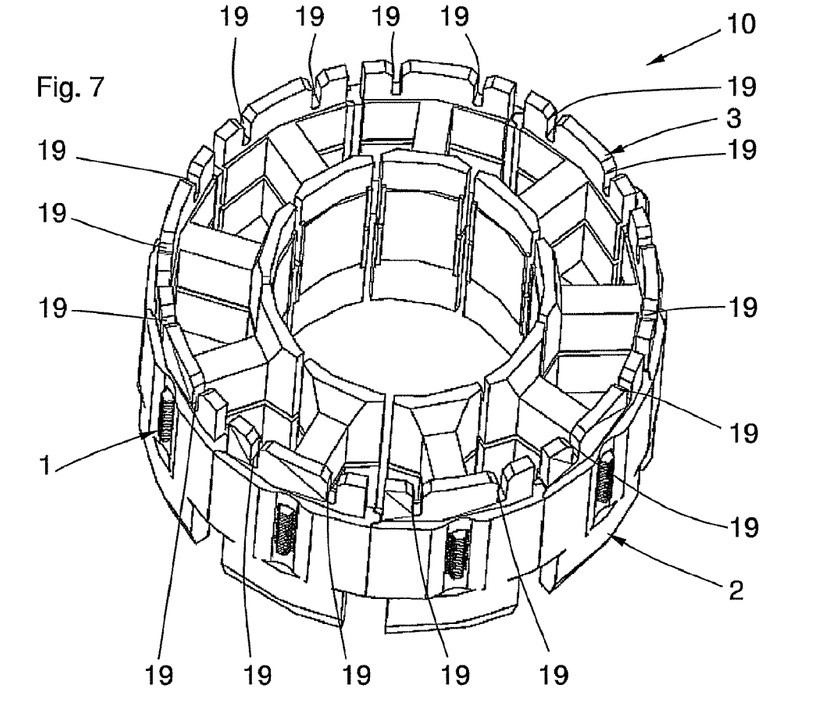
FIG. 7 shows stator poles assembled to a stator with mounted end caps.

FIG. 6 shows, for explanation, a stator ring assembled from nine stator poles without end caps and without winding. In the depicted form, the stator is not in an assembly step, because initially the end caps and the winding are applied. FIG. 7 shows the stator from FIG. 6 with the installed end caps 2 and 3. The winding is left out in the interest of simplicity. The end caps do not extend into a radial area between the stator pole and pole shoe and a rotor (not shown here). All end caps 3 with slits 19 are arranged on the same side of the stator poles and all end caps 2 without slits on the opposite side.

Figure 8:
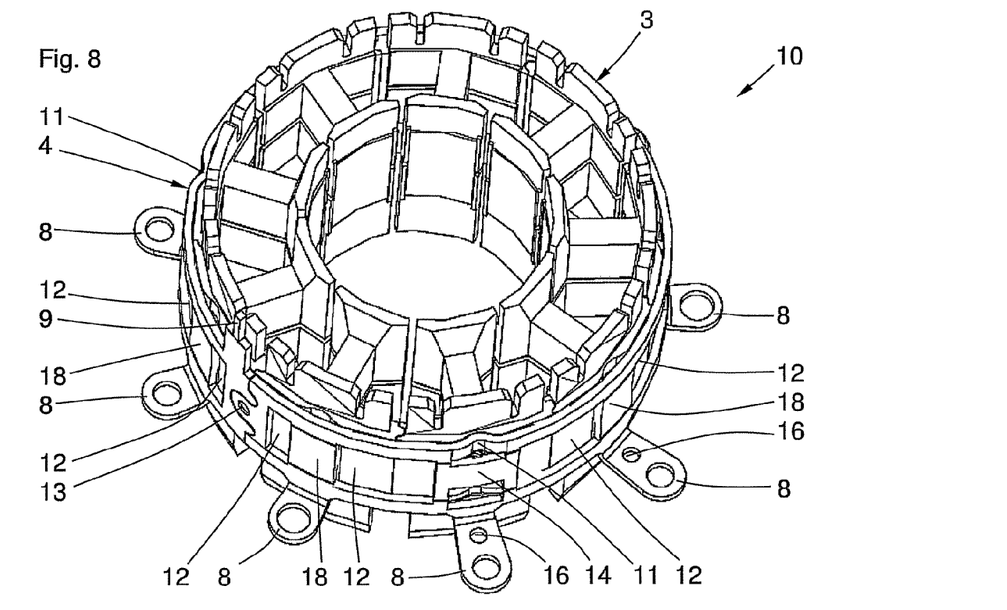
FIG. 8 shows the stator from FIG. 7 with a clamping ring.
Figure 9:
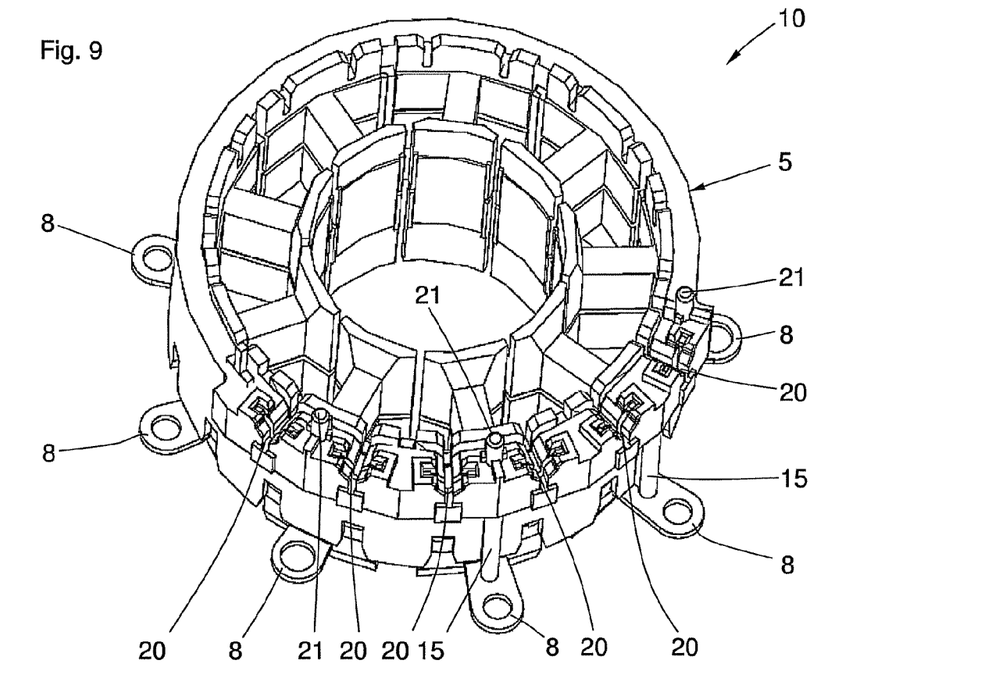
FIG. 9 shows the stator from FIG. 8 with an insulation ring.
Figure 10:
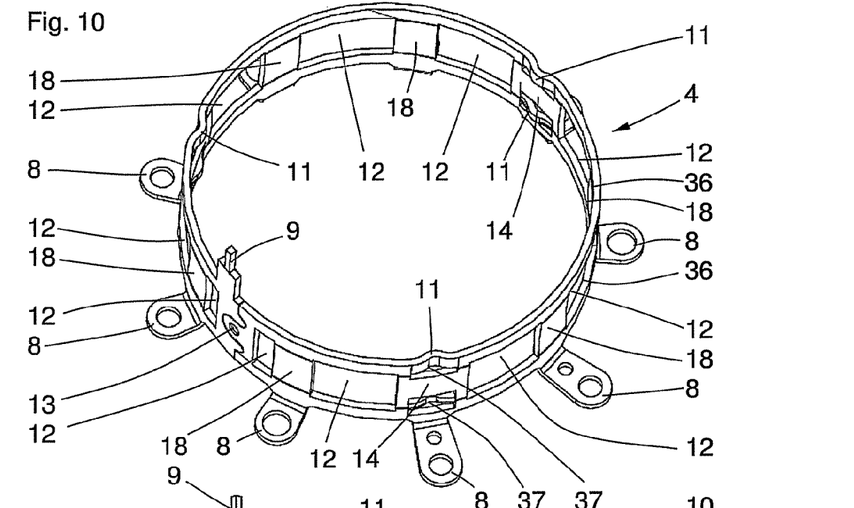
FIG. 10 shows the clamping ring as an individual part.

FIG. 8 shows the arrangement according to FIG. 7 with the additionally mounted clamping ring 4, which serves as retaining part for the stator poles. The clamping ring 4 is shown in FIG. 10 as an individual part. The clamping ring in the depicted example is rolled from a punched sheet metal strip and mechanically connected on the ends. The connection site 13 is formed as a caulked button. The clamping ring essentially consists of two ring areas 36, which are connected to each other via bridges 18. The brides 18 are deformed slightly radially inward in their center, so that a radial bias is present, which, after assembly, ensures connection free of play between the clamping ring and the stator poles. The connection is partially interrupted at three locations between the two ring areas 36 by recesses 37, so that connectors 14 remain and H-shaped connection areas remain between the ring areas 36. The ring areas 36 are deformed radially inward on the peripheral sections relative to connectors 14. The axially inward deformed areas serve as axial securing connectors 11 for axial fastening to the protrusions 23 of stator poles 1.

The clamping ring 4 is also in one piece with screw eyes 8, which are angled at a right angle and extend radially outward. The screw eyes 8 are arranged in the peripheral sections, in which bridges 18 or connectors 14 are present between the ring areas 36. The screw eyes 8 serve as fastening possibility of the mounted stator in a motor housing. Adjustment perforations 16 are also provided parallel to the screw eyes 8, which are necessary for precise position assignment of the stator in the motor housing. The clamping ring 4 includes a neutral point connection 9 that protrudes axially. The clamping ring can therefore serve an additional function as electrical neutral point connection 9 for the stator winding.

Figure 13:
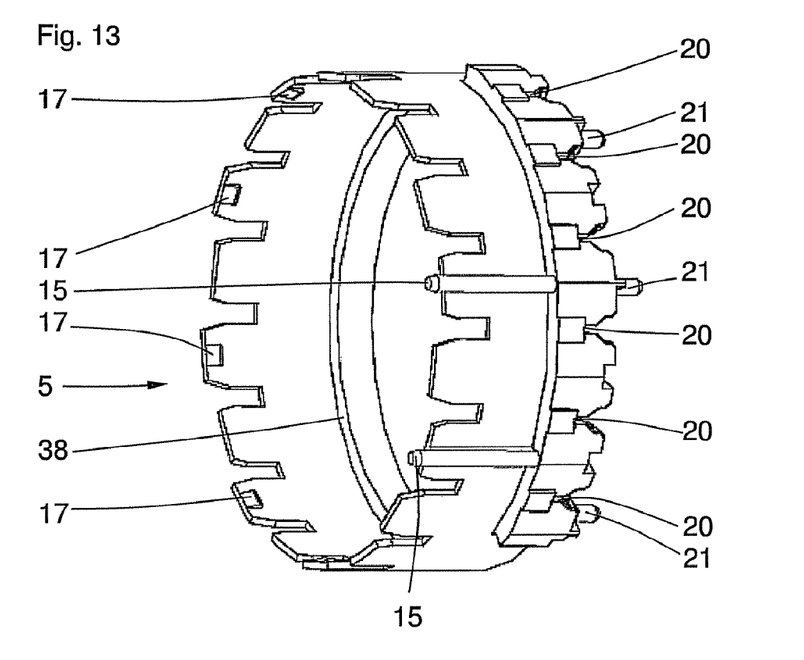
FIG. 13 shows the insulation ring of the individual part.
Figure 14:
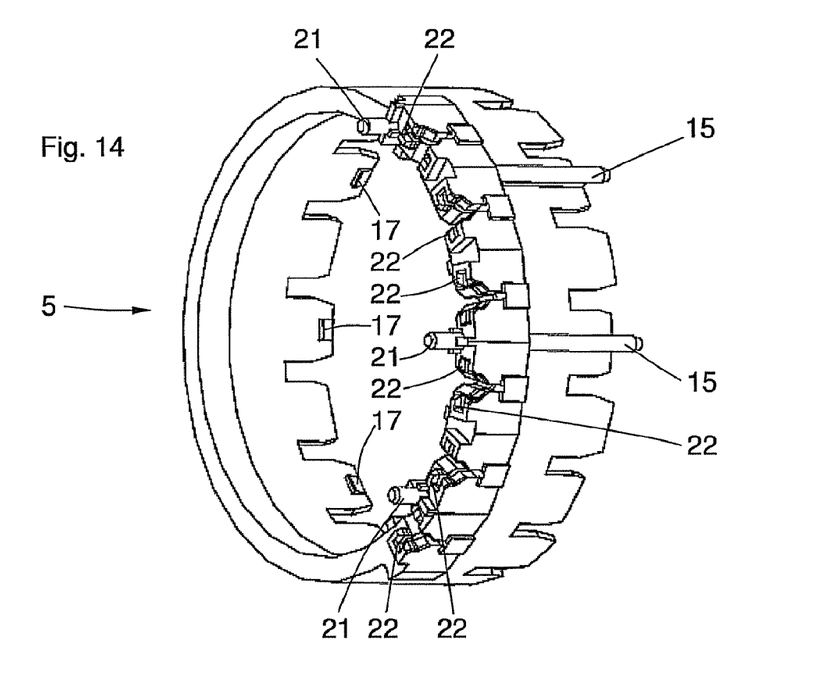
FIG. 14 shows the insulation ring from another perspective.

FIG. 13 and 14 show the insulation ring as an individual part. The insulation ring has an area with reduced diameter on a first axial end on its inside periphery, which forms a stop ring 38. On the opposite axial end, the insulation ring is interrupted several times, in order to achieve radial flexibility for its mounting on a stator. Snap hooks 17 are molded on the inside periphery on several tabs remaining through the interruptions. The area between the snap hooks and the stop ring 38 is provided as receiving space for the clamping ring 4. Adjustment pins 15 are formed with the insulation ring 5, which can be joined in the adjustment perforation 16 of the clamping ring and therefore permit precise alignment. Adjustment pins 21 are molded on the axially opposite side, which serve for adjustment of a circuit board. The insulation ring 5 also has slits 20 to accommodate the winding ends of the stator windings. On the inner areas of slits 20, receptacles 22 are connected for insulation displacement contacts, which are fastened to the circuit board. The slits 20 are flush with the slits 19 of the end caps 3 and are mounted on the same side of the stator poles.

Figure 11:
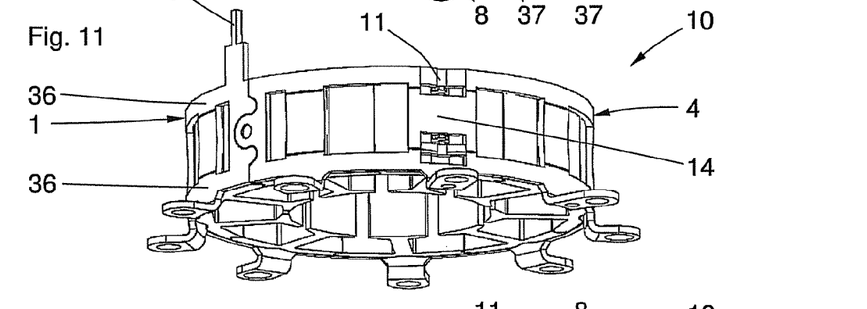
FIG. 11 shows the mounted clamping ring with stator without end caps.

FIG. 11 shows a simplified stator 10 without end caps and winding with the mounted clamping ring 4. The axial securing connectors 11 occupy the space of the recesses 30 and secure the clamping ring 4 axially on the protrusions 23 against the stator poles.

Figure 12:
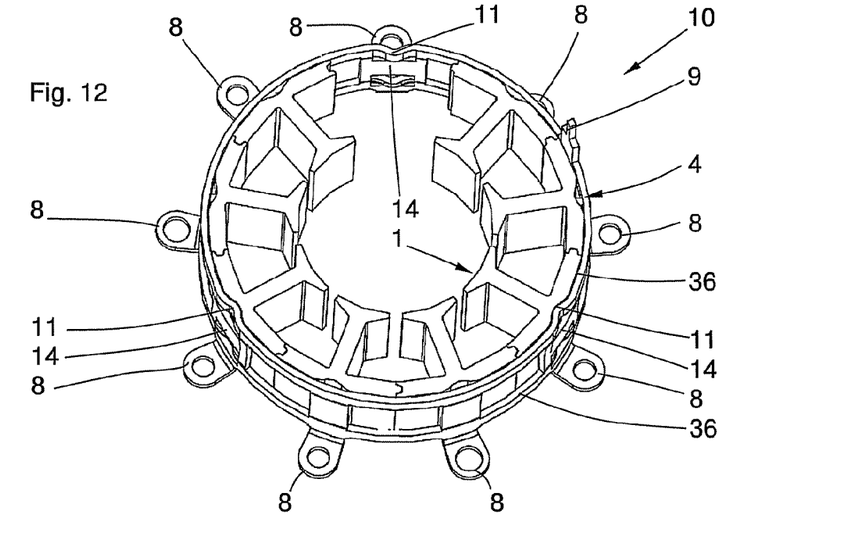
FIG. 12 shows the stator according to FIG. 11 from another perspective with the pole left out.

FIG. 12 shows another perspective of the stator according to FIG. 11, in which one pole is left out for better explanation. It is readily apparent that the connector 14 retains the peripheral contour of the clamping ring 4, while the axial securing connectors 11 are deformed inward. To obtain this shape, the axial securing connectors 11 must be stretched relative to their original shape.

Figure 15:
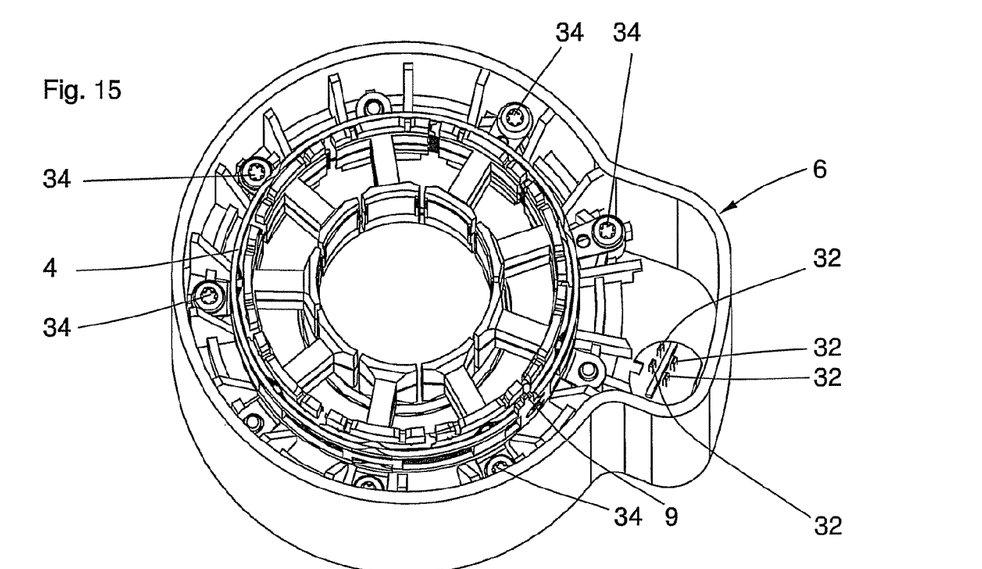
FIG. 15 shows the stator arranged in a motor housing without insulation ring.

FIG. 15 shows the stator 10, which is mounted axially in the motor housing 6 via screws 34. The stator is shown here without insulation ring. Plug pins 32 are mounted in an area of the motor housing 6 radially connected to the stator.

Figure 16:
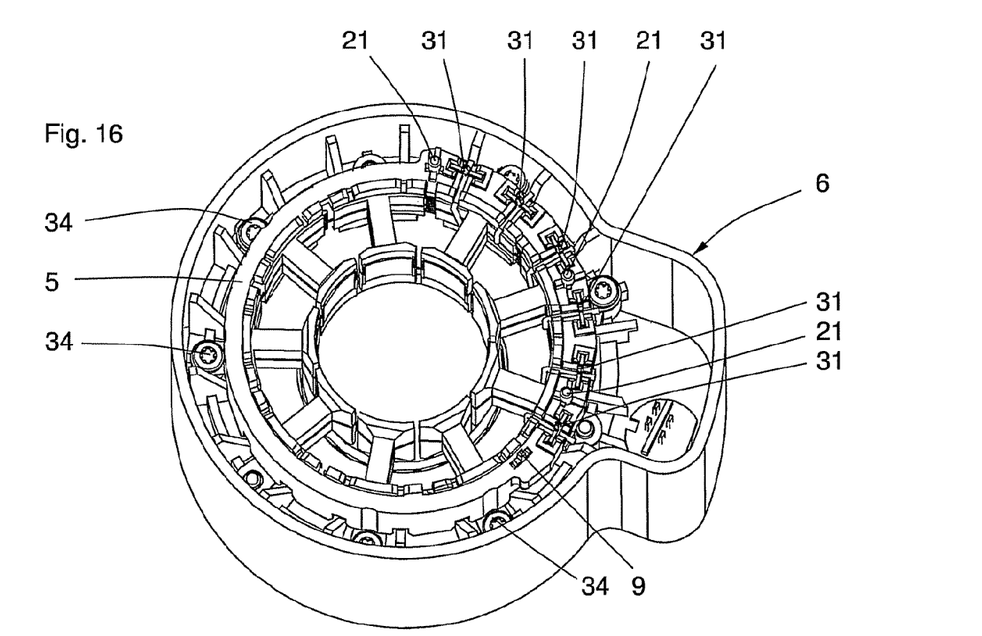
FIG. 16 shows the stator according to FIG. 15 with insulation ring.

FIG. 16 shows the arrangement of FIG. 15 with insulation ring 5, in which insulation displacement contacts 31 are shown, which are actually not provided without a circuit board in this assembly state.

Figure 17:
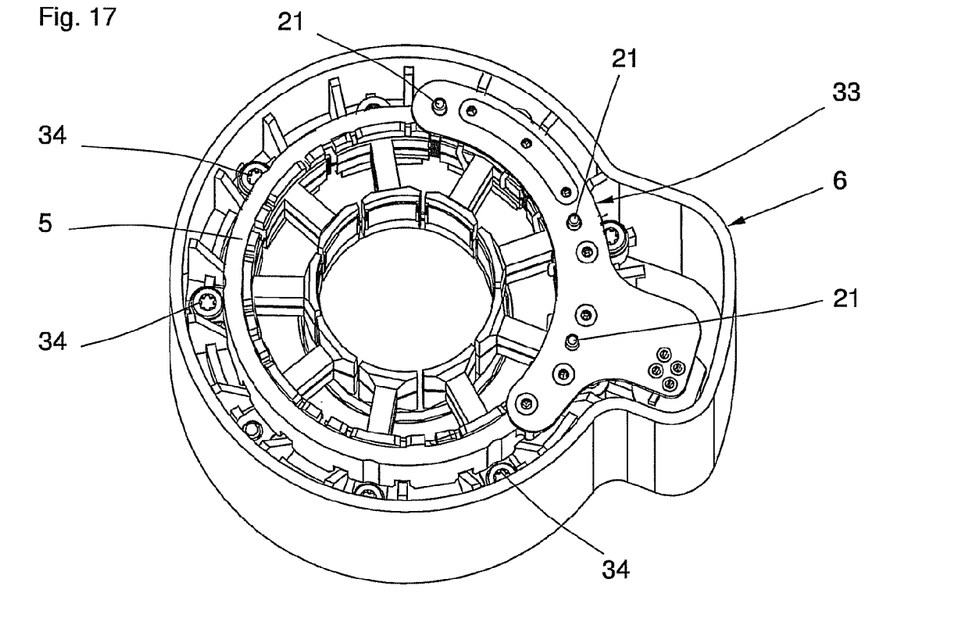
FIG. 17 shows the stator according to FIG. 16 with a circuit board.

FIG. 17 shows the arrangement from FIG. 16 with a circuit board 33, which is plugged onto the adjustment pins 21 of the insulation ring 5 and connects the stator windings to each other and connects to the plug pins 32.

Figure 18:
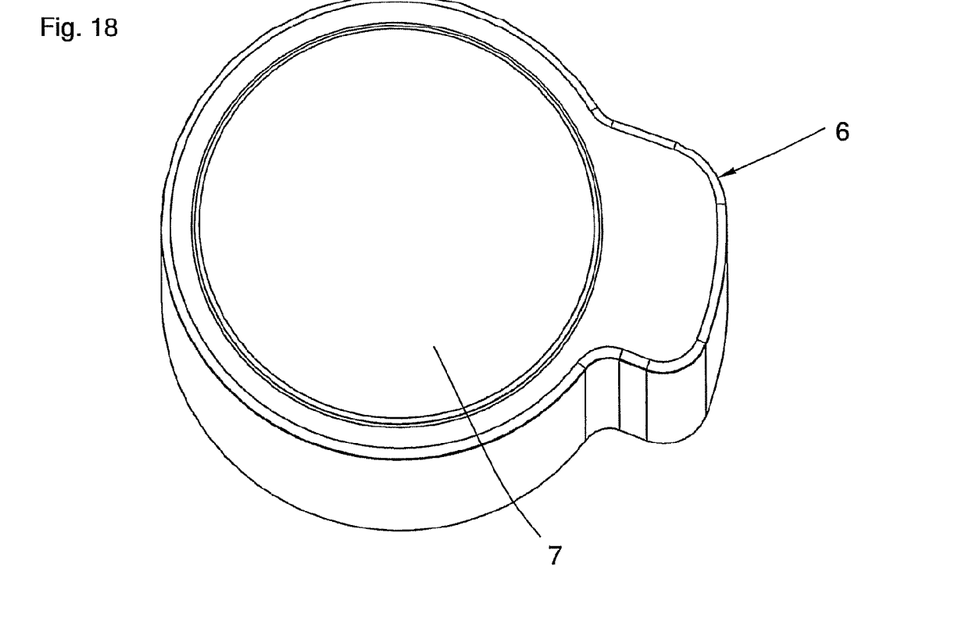
FIG. 18 shows the stator according to FIG. 17 with the closed motor housing.

FIG. 18 shows the closed motor housing 6 with a housing cover 7.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

List of Reference Numbers
1 Stator pole
2 End cap without slit
3 End cap with slit
4 Clamping ring
5 Insulation ring
6 Motor housing
7 Housing cover
8 Screw eye
9 Neutral point connection
10 Stator
11 Axial securing connector
12 Perforation
13 Connection site
14 Connector
15 Adjustment pin for clamping ring
16 Adjustment perforation
17 Snap hook
18 Bridge
19 Slit in end cap
20 Sit in insulation ring
21 Adjustment pin for circuit board
22 Receptacle for insulation Displacement contact
23 Protrusion
24 Receptacle space for pole
25 Pole core
26 Pole shoe
27 Return section
28 Concave profile
29 Convex profile
30 Recess
31 Insulation displacement contact 32 Plug pin
33 Circuit board
34 Screw
35 Return
36 Ring area
37 Recess
38 Stop ring

What is claimed is:

1. A stator for an electronically commutated DC motor, the stator comprising:
    a plurality of individual stator poles, each of said stator poles including a pole core, pole shoes and return sections, each of the return sections of the stator poles having first and second profiles that intermesh with each other so that they together form a hollow cylindrical return with a periphery, in which the pole cores connected to the return sections are directed radially inward;
    an insulation and a winding provided on each of the individual stator poles; and
    a retaining part that does not serve as part of a motor housing, wherein the retaining part is a metal clamping ring, the clamping ring including a hollow cylinder; a plurality of perforations spaced about the hollow cylinder defining spaced bridges and connectors which connect two ring areas on the entire periphery to each other, the clamping ring being positioned so that it is under bias around the entire periphery of the hollow cylindrical return and tightens the stator poles relative to each other.

2. The stator according to claim 1, wherein the two ring areas are deformed radially inward at several locations, so that they form axial securing devices.

3. The stator according to claim 2, wherein the axial securing devices are arranged in the area of the connectors, which are separated by recesses from the axial securing devices and connect the two ring areas to each other.

4. The stator according to claim 2, further comprising recesses defined in the hollow cylinder and wherein the axial securing devices engage radially inward in the recesses of the hollow cylindrical return, in which radially outward extending protrusions lie against the axial securing devices in a middle section of the recesses.

5. The stator according to claim 1, wherein the bridges are biased inward on the hollow cylindrical return.

6. The stator according to claim 1, wherein the retaining part, in the form of a clamping ring, is in one piece with a neutral point connection, which connects axially to a ring area and protrudes beyond the face of stator poles.

7. The stator according to claim 6, wherein the clamping ring is in one piece with screw eyes, the screw eyes connecting to a ring area and are bent at a right angle.

8. The stator according to claim 7, wherein the stator is screwed, caulked, riveted or ultrasonically welded to a motor housing via the clamping ring.

9. The stator according to claim 1, further comprising a circuit board, wherein the insulation ring is mechanically connected to the circuit board, the circuit board connecting the winding ends to the neutral point connection and plug pins.

10. A stator for an electronically commutated DC motor, the stator comprising:
    a plurality of individual stator poles, each of said stator poles including a pole core, pole shoes and return sections, each of the return sections of the stator poles having first and second profiles that intermesh with each other so that they together form a hollow cylindrical return with a periphery, in which the pole cores connected to the return sections are directed radially inward;
    an insulation and a winding provided on each of the individual stator poles; and a retaining part including at least one electrical connection to provide interconnection of the windings, the retaining part not serving as part of a motor housing, wherein the retaining part is a metal clamping ring, which is positioned so that it is under bias around the entire periphery of the hollow cylindrical return and tightens the stator poles relative to each other.

11. A stator for an electronically commutated DC motor, the stator comprising:
    a plurality of individual stator poles, each of said stator poles including a pole core, pole shoes and return sections, each of the return sections of the stator poles having first and second profiles that intermesh with each other so that they together form a hollow cylindrical return with a periphery, in which the pole cores connected to the return sections are directed radially inward;
    an insulation and a winding provided on each of the individual stator poles; and a retaining part that does not serve as part of a motor housing, wherein the retaining part is a metal clamping ring including a flat sheet-metal strip, whose ends are connected to each other according to a bending process and form a connection site, the clamping ring being positioned so that it is under bias around the entire periphery of the hollow cylindrical return and tightens the stator poles relative to each other.

12. A stator for an electronically commutated DC motor, the stator comprising:
    a plurality of individual stator poles, each of said stator poles including a pole core, pole shoes and return sections, each of the return sections of the stator poles having first and second profiles that intermesh with each other so that they together form a hollow cylindrical return with a periphery, in which the pole cores connected to the return sections are directed radially inward;
    an insulation and a winding provided on each of the individual stator poles; and
    a retaining part that does not serve as part of a motor housing, wherein the retaining part is a metal clamping ring, which is positioned so that it is under bias around the entire periphery of the hollow cylindrical return and tightens the stator poles relative to each other, the clamping ring being connected to an insulation ring, the insulation ring having slits to accommodate winding ends and receptacles for insulation displacement contacts.

13. The stator according to claim 12, wherein the insulation ring is provided with snap tabs that are locked on one edge of a ring area of clamping ring.

* * * * *